Aug. 12, 1941.  A. W. PLENSLER  2,252,295
INDICATING MECHANISM
Filed Dec. 14, 1939
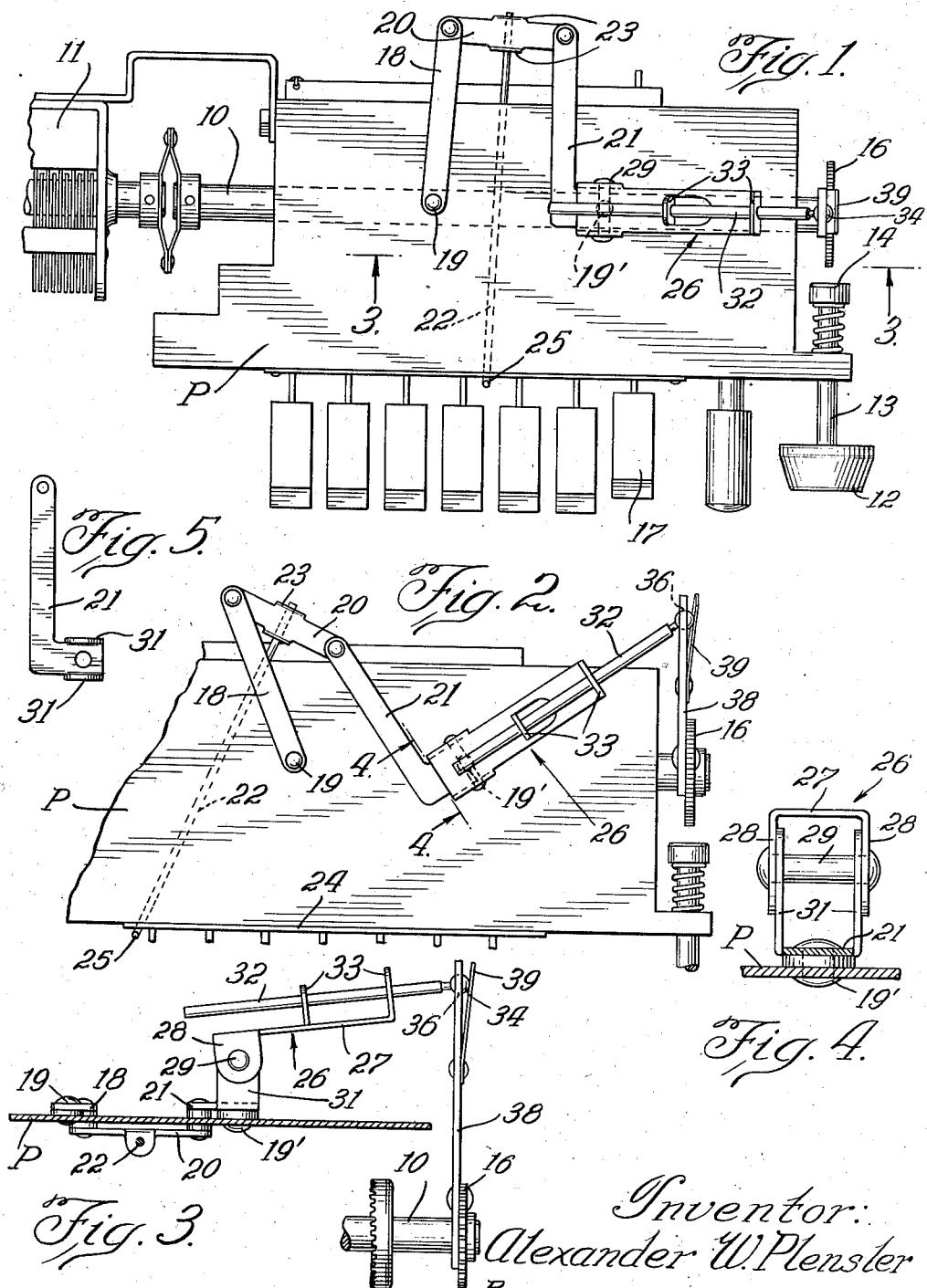
Inventor:
Alexander W. Plensler
By:— Foorman L. Mueller
Att'y.

Patented Aug. 12, 1941

2,252,295

UNITED STATES PATENT OFFICE 2,252,295

INDICATING MECHANISM

Alexander W. Plensler, Chicago, Ill., assignor to Belmont Radio Corporation, a corporation of Illinois Application December 14, 1939, Serial No. 309,279

10 Claims. (Cl. 116—124.1)

My invention relates in general to dial and indicating apparatus, and in particular to a tuning indicator for a radio receiver.

It has always been desirable to provide indicator structure for a radio receiver which operates with a small amount of actuating energy, but this has been particularly true since the advent of so-called manual push-button tuning. It is desirable to operate a push-button in apparatus for this type of tuning with the lightest possible touch and this requires that the inertia to be overcome when operating a button be reduced to a minimum. This problem, or consideration, is particularly important when employing a stationary linearly extending dial scale on a radio cabinet or housing for indicating the position of a rotary shaft in the tuning apparatus so that the rotary movement of the tuning shaft must be translated into substantially linear movement of an indicator over the dial scale.

In order to provide the necessary freedom of action of the tuning and indicator structure as above described, and at the same time provide indicating mechanism requiring a relatively small amount of space, cord or belt connections with pulleys have been provided between the indicator and the rotary shaft. However, it has been difficult from an assembly standpoint to string the belt upon the pulleys and connect it to the indicator and shaft, and then maintain the belt in proper operating position throughout the complete assembly operation for the radio receiver and subsequent shipping to the user. Furthermore, there has always been the danger of the belt not only slipping from the pulley and guide mechanism during operation, but also the danger of wearing out and breaking during the life of the radio receiver.

It is an object of my invention to provide an improved tuning indicating mechanism for a radio receiver.

A further object of my invention is to provide a free-operating indicating mechanism for converting rotary into linear movement without the use of string or belt connections.

Another object of my invention is to provide improved mechanically operated indicating apparatus for radio receiver tuning structure, which structure includes manually operated push-button tuners.

A still further object of my invention is to provide indicating apparatus which is quickly assembled into radio receiver mechanism, and is maintained in operating position throughout the assembly of the radio receiver and subsequent operation, and life thereof.

It is also an object of my invention to provide stringless or beltless indicating mechanism for a radio receiver which operates generally in a plane at right angles to a dial scale for such indicating apparatus, and requires a relatively small space from front to back of the radio receiver for mounting and operation.

One of the features of my invention is the provision of such indicating apparatus in a structure which lends itself to inexpensive changes for application to radio receiver chassis of different dimensions.

Other objects and features of my invention will be apparent from the following description taken with the drawing, in which:

Fig. 1 is a top plan view of my indicating mechanism with manually operated automatic tuning apparatus for a radio receiver.

Fig. 2 is a fragmentary illustration in plan view of the indicating mechanism itself, but in a different operating and indicating position from the position of Fig. 1.

Fig. 3 is a fragmentary illustration partly in section showing a front view of the indicating mechanism of Fig. 1.

Fig. 4 is an enlarged detailed view along the line 4—4 of Fig. 2.

Fig. 5 is a detail view of one of the link members.

In practicing my invention, I provide mechanical means for connecting a rotary tuning shaft for a radio receiver with an indicator having a pointing or indicating portion moving in a generally linear direction with reference to a dial scale on the face of a radio receiver cabinet and spaced from the rotary tuning shaft. The indicator is mounted rigidly upon a first link member pivotally connected intermediate two other link members, each of which two link members has one end pivoted from a fixed axis individual to that one end, and having the other end pivotally connected to the first link member. One of said two link members is pivotally connected to a carriage unit which has an apertured carrying portion for receiving a rod in the apertures thereon, and with said rod being slidable relative to the carrying portion. The rod is provided with a ball-like end which is retained in a socket-portion on a driving arm connecting the carriage unit to the rotary shaft, in such a manner as to provide a universal connection between the rod and driving arm.

Referring now to Fig. 1, a somewhat fragmentary illustration of manually operated tuning apparatus for a radio receiver is illustrated which includes a shaft 10 appropriately mounted in frame means which also supports a variable condenser 11 operatively connected to said shaft, and adjustable upon rotary movement of the shaft. The shaft 10 may be rotated manually by a spring-pressed knob structure which includes a knob 12, a shaft 13, and a spiral gear 14 which may be selectively connected with a gear 16 on the shaft 10. The shaft 10 may be rotated by means including a push-button 17 operable from the front of a radio receiver, and pushed in to connect with the shaft through appropriate intermediate means to rotate such shaft to a predetermined angular position. Even though complete automatic tuning apparatus is not illustrated, it is obvious to one skilled in the art that considerable mechanism must be mounted on or connected with the shaft 10 in order to effect rotation of the shaft to predetermined positions. This all adds considerable weight and inertia to the tuning apparatus which must be moved upon actuation of a button 17, and hence increased inertia as contrasted to manual tuning by means such as the knob 12, alone, and associated mechanism. It is desirable, therefore, that the mechanism to indicate the rotary position of the shaft 10, add the least possible inertia to the tuning mechanism itself.

This condition has been satisfied with the mechanism of my invention, which includes a link member 18 pivotally supported at a fixed axis 19 on the frame plate P. A second link 20 is pivotally connected to the link 18, and is also pivotally connected at one end to a third link 21 (Fig. 5). The other end of the third link 21 is pivotally supported at a fixed axis 19' (Fig. 4). The link 21 is L-shaped with an aperture in the foot of the link positioned over the axis 19'. A rod-like indicator 22 is rigidly mounted at one end in two ears 23 on the link 20, and moves with the link 20 as is obvious from Figs. 1 and 2, and as will be more clearly described hereinafter. The link members 18 and 21 act as guide links as well as mounting links for the link member 20 carrying the indicator. A dial scale 24 visible normally at the front of a radio receiver may be mounted either in front or in back of a pointer portion 25 of the indicator 22 to show the position of the tuning shaft 10 in the usual manner. For purposes of illustration, the dial scale 24 is shown in back of the pointer portion 25 and can be illuminated either from the back, edge or front, depending upon the particular construction and material of the dial scale.

The links 18, 20 and 21, are moved, to in turn move the indicator, by means of a carriage unit 26 which includes a body portion 27 having a pair of ears 28 (Figs. 3 and 4) pivotally mounted on a pin 29 which likewise extends through ears 31 on the L-shaped link 21. The rotary motion of the shaft 10 whether it is being driven as a result of operation of push-buttons 17, or the knob 12, is translated into substantially arcuate movement in the link members, and substantially linear movement of the pointer portion 25 of the indicator by means of a rod 32 slidably carried in an aperture in each of two ears 33 formed out of the body portion 27 of the carriage unit. The outer end of the rod 32 is provided with a rounded ball portion 34 which rides in an apertured socket 36 in a driving arm 38 on the shaft 10, and retained fixedly thereon. The driving arm 38 rotates with the shaft 10 in a vertical plane at right angles to said shaft. The rod 32 is connected to the arm 38 by inserting it into the apertured socket 36 in a left-hand direction as viewed in Fig. 3, for instance. The walls of the socket 36 are rounded and of such size as to prevent the ball portion 34 from moving to the left beyond the position shown in Fig. 3. The rod 32, after assembly, in the arm 38 and apertures in the ears 33 is prevented from falling out of its associated structure, and moving to the right as viewed in Fig. 3, by means of a spring arm 39 which can be moved away from the arm 38 far enough to permit the insertion of the rod 32, but springs back into place and maintains a spring tension on the apex of the ball portion 34. This provides a very simple, and easily assembled ball and socket joint between the arm 38 and the carrying portion 27.

As to the operation of the indicating mechanism, the pointer portion 25 is shown in Fig. 1 substantially in the middle of the dial scale. The pointer portion is moved to the left to the position shown in Fig. 2 upon rotation of the shaft 10 in a clockwise direction and viewing the shaft from the right end of Fig. 2. This rotary movement carries the arm 38 rearwardly, or away from the dial scale 24, and the rod 32, connecting the arm to the carriage unit 26 through the ball and socket joint at the cavity 36, moves with the arm 38. The rod 32 is maintained on the carrying portion 27 by means of the apertures in the ears 33 so that it can move only linearly or longitudinally relative to such carrying portion. The carrying portion 27 follows the rod 32, by virtue of its pivotal connection with the link 21 at the pin 29, and by virtue of the pivotal mounting of link and carrying portion on the pin 19'.

At the same time the arcuate movement of the arm 38 in a vertical plane slidably extends the rod 32 relative to the portion 27 as can be seen by comparing Figs. 1 and 2, and during all of such movement the universal connection between such rod and arm is being utilized. The pivotal movement of the carriage unit 26 in following the rod and arm pivots or rotates the link 21 in a plane substantially parallel to the frame plate P. The toggle action of the links 18, 20 and 21, with the links 18 and 21 pivoting from fixed points 19 and 19' at one end of each, but being free at the other ends, and tied together by the link 20 causes the indicator 22 to follow the movement of the link 20 with the pointer portion 25 moving substantially linearly over the scale. At the same time the movement of the various pivotally connected elements in the indicating mechanism, is confined to a relatively small space from front to rear of the radio cabinet, or housing, which is advantageous particularly in the small, so-called midget radio receivers.

From the above description, and the drawings, it is apparent, therefore, that my invention provides a simple, mechanical indicating structure for a radio receiver which is free acting so as to apply little or no inertia to the tuning shaft, which must be overcome when moving such shaft by push-button tuning. Furthermore, the parts of my structure are all simple and relatively inexpensive to manufacture and may be very quickly assembled into the tuning apparatus for the radio receiver. The indicating structure should, due to its simplicity and ruggedness, enjoy a long life, and operate efficiently.

Although I have illustrated and described my invention in its preferred embodiment, it is understood that the invention is not to be limited thereto, since modifications thereof are possible.

My invention, therefore, is only to be limited by the scope of the appended claims.

I claim:

1. Radio indicating mechanism for operative connection with a rotary tuning shaft and acting with a radio dial scale to indicate the angular position of said shaft, including in combination mounting means at right angles to said dial scale, an indicator for moving over said dial scale, and means for operatively connecting said indicator and said tuning shaft, including a link pivotally mounted on said mounting means, link means pivotally connected to said link and carrying said indicator thereon, an apertured carriage pivotally connected to said link means, a rod slidably carried in the apertures of said carriage for longitudinal movement relative to said carriage, having a rounded portion on one end, and a driving arm for operative connection with said shaft at right angles thereto, with said driving arm having a socket portion thereon for receiving the rounded portion of said rod to provide a universal connection between said rod and arm.

2. Radio indicating mechanism for use with a substantially linearly extending dial scale including in combination multi-part link means pivotally connected at one end to a fixed axis means, an indicator mounted on said link means having a pointer portion for movement over the dial scale, and with said link means being movable substantially in a single plane, a driving arm arcuately movable in a plane at right angles to the plane of movement of said link means and at right angles to said dial scale, and connecting means between said driving arm and said link means including a carriage unit pivotally connected to said link means at an end opposite to said mounted end of said link means, an elongated member having a rounded end portion operatively connected with said driving arm and slidably mounted upon said carriage for substantially longitudinal movement relative to said carriage, and means on said carriage for carrying said elongated member and guiding said elongated member in the movement thereof substantially longitudinally relative to said carriage.

3. In radio tuning apparatus including a rotary tuning shaft, means for rotating said shaft, and a dial scale corresponding to the tuning range of said apparatus, the combination of indicator means having one end thereof movable over said dial scale, and means for moving said end over said dial scale upon rotary movement of said shaft, said moving means including means for mounting said indicator means, a driving arm for operative connection with said rotary shaft, and connecting means intermediate said driving arm and said mounting means including a carriage unit pivotally connected with said mounting means, with said driving arm having an apertured socket therein, and means slidably carried upon said carriage having a rounded end portion seated in said apertured socket to provide a substantially universal connection between said carriage unit and said driving arm.

4. Indicating mechanism for a radio receiver, including frame means, a pair of guide links, with one end of each link pivotally mounted on said frame means at an axis point fixed relative to said frame means, and with the other end of each guide link movable laterally relative to any fixed point on said frame means and in a plane substantially parallel to said frame means, a link member pivotally secured at opposite ends to the other ends of said guide links, an indicator fixedly mounted upon said link member and being movable therewith, a driving arm rotatably movable in a plane at right angles to the plane of movement of the guide links, and means connecting said driving arm and one of said guide links including means pivotally connected to said one guide link, and a connector intermediate the driving arm and said means pivotally connected to said one guide link, said connector being slidable relative to said last mentioned means.

5. Indicating mechanism for a radio receiver having a rotary tuning shaft, including a pair of pivotally mounted, spaced apart guide links, a mounting link pivotally connected to one end of each of said guide links and being pivotally movable relative to each link, an indicator fixedly supported upon said mounting link, and means for operatively connecting one of said guide links with said rotary tuning shaft to cause movement of said indicator upon movement of said shaft.

6. Indicating mechanism for a radio receiver having a rotary tuning shaft, said mechanism including a driving arm operatively connected to said shaft, an indicator member having one end moving in a substantially linear path across said radio receiver, link means for supporting said indicator member, and means for operatively connecting said link means and said driving arm with said driving arm having an apertured socket therein, said connecting means including a connecting rod slidable substantially longitudinally in said connecting means and having a ball portion at one end thereof seating in the apertured socket of the driving arm for a substantially universal connection between said arm and said rod.

7. In radio tuning apparatus including a rotary tuning shaft and a dial scale corresponding to the tuning range of said apparatus, the combination of indicator means having one end thereof movable in a substantially linear path across said dial scale, link means supporting said indicator means including a link member having one end pivotally mounted at a relatively fixed pivot point and including a pair of upstanding apertured ears thereon, and means for operatively connecting said rotary shaft and said link member, including a connecting member having a body portion and a pair of downwardly extending apertured ears at one end thereof for substantially inter-leaving connection with said upstanding ears of said link member, and a pivot pin extending through the apertures in all of said ears to pivotally connect together said link member and said connecting member.

8. In radio tuning apparatus including a rotary shaft and a dial scale corresponding to the tuning range of said apparatus, the combination of an indicator for substantially linear movement over said dial scale, means for supporting said indicator to move the same over said dial scale, driving means operatively connected with the rotary shaft and having an apertured socket therein, and connecting means intermediate said supporting means and said driving means, including a rod retained in said connecting means for slidable movement substantially only in a direction longitudinally of the connecting means, means for so retaining said rod, with said rod having a ball-like portion on one end thereof and being adapted to be inserted through the aperture in said socket with such portion seating in the socket, and spring means on said driving means to retain the ball-like portion in the socket of said driving means and prevent the withdrawal of said rod longitudinally from said connecting means through said apertured socket.

9. In radio tuning apparatus having frame means and including a rotary tuning shaft and a dial scale corresponding to the tuning range of said apparatus, the combination of a pair of spaced guide links, with one end of each link pivotally mounted on said frame means at an axis point fixed relative to said frame means, a link member pivotally secured at opposite ends to the other ends of said guide links, an indicator fixedly mounted at one end upon said link member having a pointer portion movable in a substantially linear path across the face of said dial scale, said indicator being substantially parallel to each of said guide links when said pointer portion is in a position near the center of said dial scale, and means for operatively connecting one of said guide links with said rotary tuning shaft to cause movement of said indicator upon movement of said shaft, with the other end of one of said guide links being movable in a path substantially parallel to the path of said pointer portion on movement of the indicator from said center position toward one end of the dial scale.

10. Radio indicating mechanism for operative connection with a rotary tuning shaft and acting with a vertically positioned dial scale to indicate the angular position of said shaft, including in combination mounting means at right angles to said dial scale, a driving arm operatively connected to said shaft and arcuately movable in a vertical plane at right angles to said mounting means and at right angles to said dial scale, link means movable in a plane substantially parallel with said mounting means, said link means being pivotally connected at one end to axis means fixed on said mounting means, means pivotally connected at one end to said link means at said axis means and at its opposite end to said driving arms, said latter means being at right angles to said driving arm when the driving arm is in an upright position, and an indicator mounted on said link means having a pointer portion for movement over said dial scale, said pointer portion being positioned substantially centrally of said dial scale when said driving arm is in its upright position.

ALEXANDER W. PLENSLER.